Figure 1:
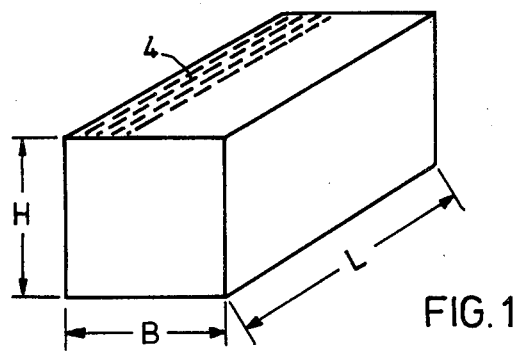

United States Patent [19]

Drinkuth et al.

[11] 4,452,905

[45] Jun. 5, 1984

[54] AQUEOUS PREPARATION AND ITS USE FOR THE PREPARATION OF CERAMIC MASSES

[75] Inventors: Franz Drinkuth, Odenthal; Wulf von Bonin, Leverkusen; Dietmar Schäpel, Cologne; Artur Lorenz, Konstanz-Litzelstetten, all of Fed. Rep. of Germany

[73] Assignee: Bayer Aktiengesellschaft, Leverkusen, Fed. Rep. of Germany

[21] Appl. No.: 448,733

[22] Filed: Dec. 10, 1982

[30] Foreign Application Priority Data

Dec. 24, 1981 [DE] Fed. Rep. of Germany ....... 3151373

[51] Int. Cl.³ ............................................. C04B 21/06
[52] U.S. Cl. ....................... 501/81; 501/82; 501/83
[58] Field of Search ............ 501/81, 82, 83, 127, 501/141, 148

[56] References Cited

U.S. PATENT DOCUMENTS 3,390,212  6/1968  Stelle ..................... 264/44

FOREIGN PATENT DOCUMENTS 2014948  11/1970  Fed. Rep. of Germany ........ 501/81
1497665  9/1967  France ................................ 501/81
2172590  9/1973  France ................................ 501/81

*Primary Examiner*—James Poer
*Attorney, Agent, or Firm*—Connolly and Hutz

[57] ABSTRACT

An aqueous preparations of a gel-like consistency, containing
 (A) 1–15% by weight of hydrophilic polyurethanes,
 (B) optionally up to 3% by weight of hydrophilic polymers which are water-soluble or capable of swelling in water, based on unsaturated monomers and/or modified cellulose derivatives,
 (C) optionally up to 2% by weight of surface active agents,
 (D) optionally up to 30% by weight of powder, and
 (E) 0.3–30% by weight of oil.

The aqueous preparation is useful as a porosifying agent in the production of porous ceramic bodies.

3 Claims, 2 Drawing Figures

U.S. Patent

Jun. 5, 1984

4,452,905

AQUEOUS PREPARATION AND ITS USE FOR THE PREPARATION OF CERAMIC MASSES

Bricks for the building industry are generally made of clay, partly with the addition of loam, sand, ground and burnt clay and/or other mineral substances. The components are homogenized in the process of preparation of being vigorously mixed with the addition of water. Thorough homogenization of the clay mass is essential for obtaining high strength bricks. In order to be able to press the moist clay mass, the material is adjusted to a special stiffness depending upon the nature of the clay and the construction of the press, as described, for example, by Leusden, Ziegeleitechnisches Jahrbuch, 1974, pages 172–226, Bau-Berlag, Wiesbaden. The prepared mass is moulded in the press and then dried and burnt to produce the brick.

The term "clays" is used in the context of this invention to cover the materials conventionally used in the building material and ceramic manufacturing industry, that is to say the very fine-grained, porous materials which have been formed by the weathering of rock rich in feldspar and may be regarded as typical examples of cohesive rocks. The cohesive characteristics are manifested by the particles sticking together so that a cohesive mass is formed which is plastic in the moist state and becomes hard and slightly cracked on drying.

Compact bricks are heavy and have a high thermal conductivity. Various processes are known for producing lighter bricks with lower thermal conductivity. Thus, for example, it is known that highly perforated brick or lattice-work brick or types of brick which are porous throughout their substance can be manufactured. It is known that bricks can be rendered porous by means of organic particles in the form of polystyrene beads, sawdust and other solid materials which burn completely in the process of burning the brick and leave little or no ash behind.

Although the known porosifying processes have an advantageous effect on the porosity of the brick body, some of them have considerable disadvantages. The porosity produced in the brick body results in a disproportionate loss of strength in the brick.

It is also found that the use of dry porosifying substances renders the material difficult to process.

One disadvantage when using polystyrene particles, for example, is the large amount of loss in the course of preparation. This disadvantage can be overcome by adding the polystyrene beads as late as possible in the process of preparation, for example in the press, but this generally has the result that the porosifying substance is insufficiently mixed with the clay mass. Another disadvantage of this process is that the polystyrene beads elastically revert to their original shape when the brick is discharged from the mouthpiece of the press.

The disadvantages of the porosifying processes when using other hydrophilic solid substances such as sawdust are also due to the porosifying substance. It is known that clay swells owing to the absorption of water; conversely, clay shrinks on drying until its moisture content has been reduced to about 5 to 10%, after which there is virtually no further shrinkage. Wood shows basically the same behaviour. Since it does not undergo significant shrinkage until its moisture content has fallen below 10%, wood particles inhibit the shrinkage of clay and impair its structure by the formation of micro cracks. This defect is most pronounced when wood particles and clay are pressed together after the mass has been mixed and the wood particles are still capable of absorbing water. In that case, the wood draws water from the clay in the shaped brick and continues to swell while the clay shrinks so that the formation of cracks is more pronounced owing to the opposing behaviour of the two components. This phenomenon results in a considerable reduction in the strength of the brick and therefore allows for no further weight reduction in the case of large bricks.

It has also been proposed to add regenerated waste oil, heavy oil or similar combustible liquid organic substances as porosifying agents in the process of preparation of the crude brick composition. This proposal has not so far been widely accepted owing to the low porosity obtainable and the difficulty of incorporating these substances uniformly and homogeneously into the clay mass without excessive modification of the machines and processes used for preparation.

It is also known that aqueous solutions of polymers, such as polyacrylamide or cellulose derivatives, or polymer dispersions have a certain action as plasticizing agents when used in the working up of ceramic masses and may also give rise to bodies with greatly reduced unit weights.

Methods have also been developed for converting ceramic slip into porous bodies by the churning in of air after the addition of surface active agents. It has not been possible to apply this process to the manufacture of bricks because the air foam structure undergoes uncontrollable destruction in the processing machines and the shaped body which is discharged from the extrusion press under a high pressure reverts elastically to its original form as in the case of the addition of expanded polystyrene beads.

The present invention was based on the requirement of finding an auxiliary agent which would avoid the disadvantages of the known porosifying processes for ceramic masses, and in particular coarse ceramic masses such as clay bricks, which are due to processing difficulties, loss of plasticity, elastic reversion to the previous form of the extruded material and loss of final strength, and which would on the contrary be useful and easy to handle as a processing auxiliary as well as a porosifying agent which would cause little loss in strength of the final product.

It has been found that these requirements can all be fulfilled in a surprisingly advantageous manner if aqueous preparations of a gel-like consistency containing oil and/or powder as well as hydrophilic polyurethanes are used as porosifying auxiliaries.

The technical advantage of the proposed process not only lies in the fact that the porosified ceramic masses obtained have a surprisingly high strength in view of the high degree of porosity obtained, but it is also found that the addition of the porosifying agents according to the invention surprisingly facilitates the process of homogenization, e.g. of the clay mass, results in good plasticity combined with excellent performance on the shaping apparatus for the crude masses, and in addition accelerates drying of the shaped products without causing increased cracking.

Figure 2:
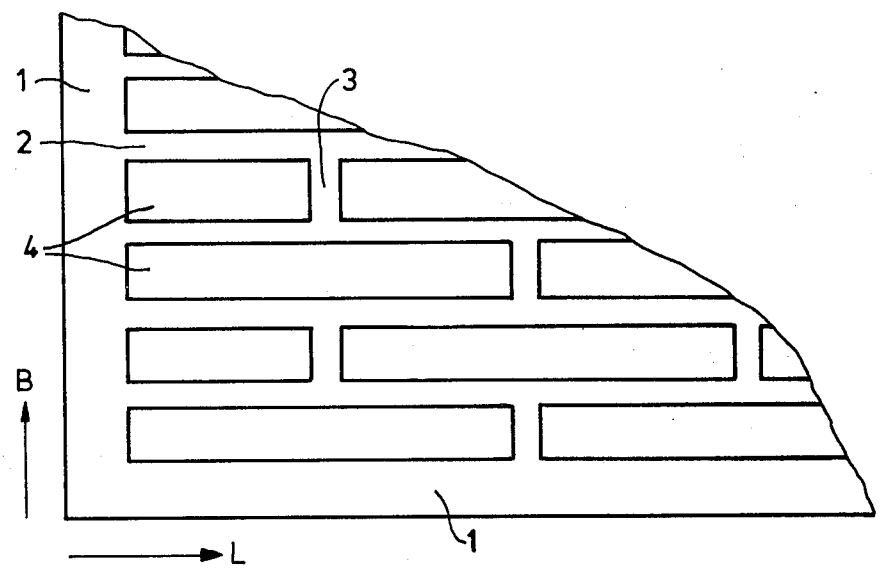

The proposed process in particular provides the possibility of producing large blocks, known as Euroblocks, measuring 30 cm in width, 49 cm in length and 23.8 cm in height as shown in FIGS. 1 and 2, or larger blocks with thinner intermediate webs, e.g. 4 mm in thickness, and enables the number of rows of perforations parallel to the wall to be increased to 22 rows in blocks 30 cm in thickness, so that the blocks have a higher heat insulating capacity combined with lower weight.

It has been found that the aqueous preparations having the structure indicated above which are to be used in the porosifying process according to the invention have a gel-like consistency with a high degree of homogeneity and a stability of dispersion which lasts for a long time. These properties enable them to produce a porosity greater than can be accounted for by the proportion of oily or pulverulent solid content incorporated and at the same time provide excellent processing characteristics in the raw ceramic masses containing them.

According to the invention, the aqueous preparations used as porosifying agents contain:

(A) hydrophilic polyurethanes,
(B) optionally hydrophilic polymers, either water-soluble or capable of swelling in water, based on unsaturated monomers and/or modified cellulose derivatives,
(C) optionally surface active agents,
(D) optionally powders,
(E) oil and water.

This invention also relates to the use of the preparations as porosifying agents for ceramic masses. The use is characterised in that the oil-containing, aqueous preparations of gel-like consistency are introduced as additives into the ceramic raw masses during the process of preparation.

According to the invention, component A of the preparation consists of covalently cross-linked hydrophilic polyurethanes which are obtainable by the reaction of prepolymers and/or semiprepolymers with water. The prepolymers and semiprepolymers have isocyanate end groups and are prepared in known manner by the reaction of polyethers which contain at least 30% by weight of ethylene oxide units with an excess quantity of di- and/or polyisocyanates. In this reaction, the quantity of di- and/or polyisocyanates is preferably calculated so that the NCO/OH ratio is from 2 to 10, depending on the desired properties of the prepolymer to be prepared. The isocyanate group content of the prepolymer or semiprepolymer is advantageously from 2 to 10% by weight, preferably from 3 to 5% by weight, based on the weight of the prepolymer or semiprepolymer.

The starting material for the prepolymers and semiprepolymers includes polyethers with a molecular weight of from 500 to 10,000, preferably from 2000 to 8000, which have at least two active hydrogen atoms and contain at least 30% by weight of ethylene oxide groups, based on the weight of the polyether. Such polyethers are prepared by the reaction of compounds having reactive hydrogen atoms, e.g. di- or polyalcohols, di- or polyphenols or aliphatic or aromatic di- or polyamines, with ethylene oxide and optionally other alkylene oxides, such as propylene oxide, butylene oxide, styrene oxide, epichlorohydrin or mixtures of these alkylene oxides.

The starting compounds for the prepolymers and semiprepolymers also include aliphatic, cycloaliphatic, araliphatic, aromatic or heterocyclic polyisocyanates such as those described e.g. by W. Siefgen, Leibigs Annalen der Chemie, Volume 562, pages 75–136.

The quantity of prepolymer required for the formation of the hydrophilic polyurethanes contained in the preparations according to the invention is from 1–15% by weight, preferably from 1.5–6% by weight, based on the total weight of the preparation.

Component B of the preparations according to the invention may include polymers based on polypeptides, polysaccharides such as casein, gelatine, alginates, carrageenates, xanthanes, starches, quinitol; celluloses such as carboxymethylcellulose, methyl cellulose or hydroxyethyl cellulose and polymers based on unsaturated monomers such as polyvinyl alcohols. These components B may be used singly or as mixtures.

The quantity of components B in the preparations according to the invention is from 0.05–3% by weight, preferably from 0.1–1.5% by weight, most preferably from 0.2–0.8% by weight, based on the total weight of the preparation.

Component C, which is optionally used in the preparations according to the invention, consist of ionic or non-ionic wetting agents and emulsifiers.

The numerous groups of substances known in the art which are, in principle suitable for this purpose include e.g. sulphonates of aromatic, aliphatic or araliphatic compounds, sulphonic acid esters, taurates, quaternary ammonium compounds, ethylene oxide copolymers, e.g. with propylene oxide, salts of fatty acids or their complex esters, fatty alcohols, saccharic esters and products of addition of ethylene oxide with hydrophobic alcohols, amines or fatty acids. The products of addition of ethylene oxide with isononylphenol have proved to be particularly suitable e.g. the product of addition of 8–15 mol of ethylene oxide with isononylphenol, because such surface active agents are relatively unaffected by the ionic impurities liable to be present in ceramic materials.

The quantity of component C may be up to 25% by weight and is preferably from 0.02–1% by weight, most preferably from 0.03–0.5% by weight, based on the total weight of the preparation.

The pulverulent substances optionally used as component D in the preparations according to the invention may be organic or inorganic dusts or powders predominantly consisting of particles of not more than 90 μm.

Among the numerous substances basically suitable for this purpose, such as meals obtained from the shells and/or fruits of olives, nuts and pulses, straw, tree barks and wood, one substance which has proved to be particularly suitable is coal dust obtained both from the preparation of mineral coal and from the preparation of charcoal or produced from these types of coal by grinding.

Powders based on inorganic substances include e.g. calcium carbonate, pumice stone flour or siliceous products such as short glass fibres, micro beads, hollow micro beads, silica or glass powder.

The quantity of component D is up to 30% by weight, preferably up to 25% by weight, most preferably from 8–15% by weight, based on the total weight of the aqueous preparation.

The oils present as component E according to the invention are fluid organic substances with viscosities at 75° C. of below $10^4$ cp (mPa.s), especially the CHO and CH compounds normally regarded as oils. They may be cyclic or linear, aromatic, araliphatic or aliphatic, animal, vegetable, mineral or synthetic oils.

Inexpensive hydrocarbon oils obtainable e.g. from fruits containing oil or from petroleum are particularly suitable e.g. the various fuel oil fractions, lubricating oil fractions and corresponding waste or regenerated oils or other industrial oils such as so-called paraffin oil, white oil or also spindle oil, which is particularly suitable.

The oil in the aqueous preparations should have a droplet diameter of from 0.1 to 100 micron, preferably from 1.0 to 50 micron. The oils used for the aqueous preparations according to the invention preferably have boiling points above 100° C., in particular above 200° C.

The quantity of oil contained in the preparations according to the invention is from 0.3–30% by weight, preferably from 1–20% by weight, most preferably from 1.5–15% by weight, based on the total weight of the aqueous preparation.

These oils may be used singly or as mixtures which should also be kept within the quantities mentioned above. Although the quantities indicated above could in principle be exceeded without preventing preparation of the aqueous preparations, this is not to be recommended in view of the large amount of organic material which would then be present in the ceramic performs. If, on the other hand, the oil contents are below those recommended, the processing characteristics of the crude masses which are to be porosified are found to be impaired.

Preparation of the aqueous preparations of oils which are to be used according to the invention as porosifying agents may be carried out batchwise or continuously.

It is advantageous first to prepare a preparation of component E and optionally also B, C and D in water and then to stir component A into this preparation. Alternatively, all the components may be introduced together into a mixing apparatus as a mixture or in the form of their solutions. One may also consider the possibility of first preparing a pourable pulverulent or liquid concentrate and then adjusting this to the required concentration before use by the addition of other components still required, e.g. water.

The aqueous oil preparations used as porosifying agents are added to the raw ceramic masses in quantities of from 5 to 50% by weight, preferably from 8 to 40% by weight, in particular from 10 to 35% by weight, based on the raw ceramic mixture. Addition of the porosifying agent may in principle be carried out at any stage of the process of preparation for the raw masses although it is, of course, preferably added during the process of homogenization, whether this be carried out in a circular loader, pug-mill or mixing screw.

FIGS. 1 and 2 illustrate the brick known as Eurob-lock.

FIG. 1 is a view in perspective, H, B and L indicating the height, width and length having the preferred dimensions described earlier. The rows of perforations 4 are shown approximately true to scale in FIG. 2 as an enlarged portion of the surface B×L. The brick has a relatively thick outer wall 1, with a thickness of 9 mm. The rows of perforations 4 are formed by webs 2 and 3 which only need to have a thickness of about 4 mm when the aqueous preparations are used according to the invention, with the result that the number of rows of perforations can be increased to 22. The individual perforations measure 9 mm in width and 64 mm in length.

The preparation and action of the porosifying agents according to the invention are illustrated by way of example below. The parts and percentages given relate to weight unless otherwise indicated.

EXAMPLE 1

(a) Preparation of the prepolymer

A mixture of 150 parts by weight of tolylene diisocyanate (80% 2,4- and 20% 2,6-isomers) and 1200 parts by weight of a polyether which has been obtained by the addition of 60% by weight of ethylene oxide and 40% by weight of propylene oxide to glycerol and has a hydroxyl number of 28 is heated to 80° within 30 minutes with stirring. The reaction mixture continues to be stirred for a further 3 hours at this temperature and is then cooled to room temperature. The prepolymer obtained has an isocyanate content of 3.7% and a viscosity of 9500 mPa.s at 25° C.

(b) Preparation of the aqueous preparation 24.1 Parts of fuel oil El are added to 72.3 parts of water and the mixture is mechanically stirred at 2000 revs/min for 0.5 minutes.

3.6 parts of the prepolymer obtained according to (a) are added to the mixture with continued stirring and the mixture is stirred for a further 5 minutes at 4000 revs/min when all the prepolymer has been added. A gel forms within 10 minutes.

EXAMPLE 2

The mixture components used in Example 1b are mixed in various proportions by the same method as in Example 1b. A gel is obtained in each case.

| Experiment | 1 | 2 | 3 | 4 | 5 | 6 | 7 | 8 |
|---|---|---|---|---|---|---|---|---|
| Water | 77.1 | 81.9 | 86.7 | 67.5 | 87.3 | 82.5 | 77.7 | 72.8 |
| Fuel Oil | 19.3 | 14.5 | 9.7 | 28.9 | 9.7 | 14.5 | 19.3 | 24.2 |
| Prepolymer | 3.6 | 3.6 | 3.6 | 3.6 | 3.0 | 3.0 | 3.0 | 3.0 |

EXAMPLE 3

3.15 Parts of fuel oil El are added to 93.7 parts of a 2.5% aqueous starch solution (potato starch) and the mixture is mechanically stirred for 0.5 minutes.

3.15 Parts of the prepolymer obtained according to Example (1a) are added to the mixture with continued stirring and the mixture is then stirred for a further 5 minutes at 4000 revs/min after all the prepolymer has been added. A gel forms within a further 10 minutes.

EXAMPLE 4

The mixture components used in Example 3 are mixed in various proportions by the same method as in Example 3. A gel is obtained in each case.

| Experiment | 1 | 2 | 3 | 4 |
|---|---|---|---|---|
| Starch solution | 90.6 | 87.5 | 84.35 | 81.35 |
| Fuel Oil | 6.25 | 9.35 | 12.5 | 15.5 |
| Prepolymer | 3.15 | 3.15 | 3.15 | 3.15 |

EXAMPLE 5

24.3 Parts of fuel oil EC and 1.2 parts of emulsifier (based on amide-oleic acid) are added in succession to 72.9 parts of water, and the mixture is mechanically stirred at 3000 revs/min for 2 minutes.

1.6 parts of the prepolymer obtained according to Example (1a) are added to the mixture with further stirring and the mixture is stirred for a further 6 minutes at 4000 revs/min after all the prepolymer has been added. A gel forms within 10 minutes.

EXAMPLE 6

0.5 Parts of carboxymethylcellulose (CMC), degree of substitution: 0.4–0.6, viscosity: about 200 mPa.s (determined on a 2% aqueous solution at 20° C. according to Haake), 9.5 parts of fuel oil EL and 3.0 parts of the prepolymer obtained according to Example (1a) are added in succession to 87.0 parts of a 0.3% aqueous polyvinyl alcohol solution and the mixture is stirred for 60 seconds at 800 revs/min. A gel forms within 15 minutes.

EXAMPLE 7

The mixture components used in Example 6 are mixed in various proportions by the same method as in Example 6. A gel is obtained in each case.

| Experiment | 1 | 2 | 3 |
|---|---|---|---|
| Water | — | 43.4 | 28.9 |
| PVA solution | 86.5 | 43.4 | 57.9 |
| CMC | 1.0 | 0.5 | 0.5 |
| Fuel Oil | 9.5 | 9.6 | 9.6 |
| Prepolymer | 3.0 | 3.1 | 3.1 |

EXAMPLE 8

73.5 Parts of demineralized water (15° C.), 9.4 parts of fuel oil EL and 2.4 parts of prepolymer obtained according to Example (1a) are added in succession to 14.7 parts of a 3% aqueous carboxymethylcellulose solution (viscosity of the carboxymethylcellulose: about 30 mPa.s determined on a 2% aqueous solution at 20° C. according to Haake), and the mixture is stirred mechanically at 600 revs/min for 1 minute. A gel forms within 15 minutes.

EXAMPLE 9

The mixture components used in Example 8 are mixed in various proportions by the same method as in Example 8. A gel is obtained in each case.

| Experiment | 1 | 2 | 3 | 4 | 5 | 6 | 7 |
|---|---|---|---|---|---|---|---|
| CMC solution | 15.33 | 15.7 | 16.33 | 16.00 | 15.0 | 14.0 | 27.0 |
| Water | 72.77 | 72.4 | 71.77 | 71.80 | 72.8 | 73.8 | 61.4 |
| Fuel Oil | 9.5 | 9.5 | 9.5 | 10.0 | 10.0 | 10.0 | 9.6 |
| Prepolymer | 2.4 | 2.4 | 2.4 | 2.2 | 2.2 | 2.2 | 2.0 |

EXAMPLE 10

73.55 parts of demineralized water (10° C.), 9.42 parts of spindle oil (ISO VG 22 DIN 51519) and 2.40 parts of the prepolymer obtained according to Example (1a) are added to 14.63 parts of a 3% aqueous carboxymethylcellulose solution (viscosity of carboxymethylcellulose: about 30 mPa.s, determined on a 2% solution at 20° C. according to Haake), and the mixture is stirred mechanically at 600 revs/min for 1 minute. A gel forms within 15 minutes.

EXAMPLE 11

The mixture components used in Example 10 are mixed in various proportions by the same method as in Example 10. A gel is obtained in each case.

| Experiment | 1 | 2 | 3 | 4 | 5 | 6 | 7 | 8 |
|---|---|---|---|---|---|---|---|---|
| CMC solution | 14.68 | 14.76 | 17.00 | 17.05 | 17.06 | 17.14 | 17.10 | 13.34 |
| Water | 73.85 | 74.22 | 70.44 | 70.51 | 70.58 | 70.56 | 70.72 | 74.16 |
| Spindle Oil | 9.45 | 9.50 | 10.04 | 10.03 | 10.04 | 10.08 | 10.06 | 10.00 |
| Prepolymer | 2.02 | 1.52 | 2.52 | 2.41 | 2.32 | 2.22 | 2.12 | 2.50 |

EXAMPLE 12

34.75 Parts of demineralized water, 28.09 parts of spindle oil (ISO VG 22 DIN 51519) and 2.41 parts of prepolymer obtained according to Example (1a) are added in succession to 34.75 parts of a 0.3% aqueous polyvinyl alcohol solution and the mixture is stirred mechanically at 600 revs/min for 45 seconds. A gel forms within 10 minutes.

EXAMPLE 13

The mixture components used in Example 12 are mixed in various proportions by the same method as in Example 12. A gel is obtained in each case.

| Experiment | 1 | 2 | 3 | 4 | 5 | 6 | 7 |
|---|---|---|---|---|---|---|---|
| PVA solution | 33.41 | 32.17 | 29.95 | 28.63 | 26.31 | 25.53 | — |
| Water | 33.41 | 32.17 | 29.95 | 28.63 | 26.31 | 25.53 | 50.19 |
| Spindle oil | 30.86 | 33.43 | 38.04 | 40.77 | 45.56 | 47.17 | 46.33 |
| Prepolymer | 2.32 | 2.23 | 2.06 | 1.97 | 1.82 | 1.77 | 3.48 |

EXAMPLE 14

(a) Preparation and homogenization of the ceramic mass

An illitic-sericitic clay containing a small proportion of Kaolinite Fire Clay was worked up and homogenized in the laboratory, using a fine rolling mill and circular screen loader (manufactured by Rieterwerke Dipl.-Ing. Walter Händle, Constance) and adjusted to a stiffness of about 27 mm peppercorn residual height.

30 Parts by volume of the gel-like mixture according to the invention obtained as in Example (1b) were added to 100 parts by volume of the resulting clay mass (density 1.9 g/cm$^3$) which was then again mixed and homogenized in the circular screen loader.

(b) Manufacture of the bricks

The clay mass obtained according to (a) was pressed in a laboratory brick press (laboratory vacuum apparatus KLVA 80) to produce perforated bricks containing about 15% of perforations, based on the cross-section, and the bricks were stored open at room temperature until equilibrium moisture was attained.

The bricks were then kept at a raised temperature in a drying cupboard for 8 hours and subsequently heated to 950° C. at the rate of 80° Centigrade per hour in an electric furnace. This temperature of 950° C. was maintained for 4 hours. The bricks were cooled by the natural cooling of the furnace.

The bricks were found to have the following properties after 3 days' storage at room temperature:

Total shrinkage: 8.35% (linear)

Body density: 1.68 g/cm$^3$

Strength of brick: 30.5 N/mm² (average value) determined on 10 test samples, height=55 mm, length=57 mm, width=27 mm).
The following were also determined:
Proportion of mixing water contained in the bricks: 34.1% (atro)
Rigidity (peppercorn): 11.7 mm
Drying time: 64 hours

EXAMPLE 15 (COMPARISON)

Employing the procedure described in Example 14, 30 parts by volume of polystyrene particles (diameter 3–5 mm, Manufactures BASF AG) were added to 100 parts by volume of the same clay which was then worked up into bricks. The properties tested were as follows:
Total shrinkage: 8.15% (linear)
Body density: 1.475 g/cm³
Strength of brick: 18.3 N/mm² (average value)
Proportionn of mixing water contained in the bricks (atro): 23.1%
Rigidity (peppercorn): 28.0 mm
Drying time: 68.0 h

EXAMPLE 16 (COMPARISON)

The same clay was made up into bricks by the procedure of Example 14 but without the use of additives. The properties tested were as follows:
Total shrinkage: 8.95% (linear)
Body density: 1.90 g/cm³
Strength of brick: 45.0 N/mm² (average value)
Proportion of mixing water contained in the bricks (atro): 22.6%
Rigidity (peppercorn): 29.2 mm
Drying time: 67 h

EXAMPLE 17

(a) Preparation and homogenization of the ceramic mass:
 30 Parts by volume of the gel-like mixture according to the invention obtained according to Example 2, experiment 3, were added to 100 parts by volume of a kaolinite clay containing sericitic illite and the components were mixed and homogenized in a laboratory round screen loader and adjusted to a rigidity of about 29 mm peppercorn residual height.
(b) Manufacture of the bricks
The clay mass (density 1.8 g/cm³) obtained according to (a) was made up into bricks by the procedure of Example (14b). The properties tested were as follows:
Total shrinkage: 8.3% (linear)
Body density: 1.47 g/cm³
Strength of brick: 84.5 N/mm² (average value)
Proportion of mixing water contained in the bricks (atro): 26.6%
Drying time: 29 h

EXAMPLE 18

Using the procedure of Example 17, 64 parts by volume of the mixture according to the invention obtained according to Example 2, experiment 3, were added to 100 parts by volume of the same clay and the mixture was made up into bricks. The properties tested were as follows:
Total shrinkage: 7.5% (linear)
Body density: 1.41 g/cm³
Strength of brick: 30.8 N/mm² (average value)
Proportion of mixing water contained in the bricks (atro): 30.0%
Drying time: 28 h

EXAMPLE 19 (COMPARISON)

Employing the procedure of Example 17, the same clay was made up into bricks without the addition of the gel-like mixture according to the invention. The properties tested were as follows:
Total shrinkage: 8.9% (linear)
Body density: 1.65 g/cm³
Strength of brick: 88.5 N/mm² (average value)
Proportion of mixing water contained in the bricks (atro): 22%
Drying time: 49 h

EXAMPLE 20

30 parts by volume of the gel-like mixture according to the invention obtained in Example 10 were added to 100 parts by volume of a mixture of loess loam and clay (40 parts by weight loess loam, particle size 88% 0.2 mm, 45% 0.02 mm, and 60% by weight of opaline clay, particle size 98% 0.20 mm, 62% 0.02 mm) containing about 17% of water, based on the dry loess/clay mixture, and the mixture was made up into bricks by the method of Example 17. The properties tested were as follows:
Total shrinkage: about 7.8% (linear)
Body density: 1.68 g/cm³
Strength of brick: 22. N/mm² (average value)

EXAMPLE 21 (COMPARISON)

The clay used in Example 20 was made up into bricks by the procedure of Example 17 without the addition of the gel-like mixture according to the invention. The properties tested were as follows:
Total shrinkage: 8.2% (linear)
Body density: 1.84 g/cm³
strength of brick: 64.0 N/mm² (average value)

EXAMPLE 22

12 Parts of fuel oil EL and
20 parts of lignite dust (particle size: 80% <90 μm) are added to
72 parts of water at 10° C. and the mixture is mechanically stirred for 1 minute at 4000 revs/min.
Stirring is continued while
3 parts of the prepolymer obtained according to Example (1a) are added to this mixture and stirring is continued for a further 2 minutes. A gel forms within 6 minutes.

It will be appreciated that the instant specification and examples are set forth by way of illustration and not limitation, and that various modifications and changes may be made without departing from the spirit and scope of the present invention.

We claims:
1. Aqueous preparations of a gel-like consistency, containing
(A) 1–15% by weight of hydrophilic polyurethanes,
(B) optionally up to 3% by weight of hydrophilic polymers which are water-soluble or capable of swelling in water, based on unsaturated monomers and/or modified cellulose derivatives,
(C) optionally up to 2% by weight of surface active agents,
(D) optionally up to 30% by weight of powder, and
(E) 0.3–30% by weight of oil.

2. Ceramic mass containing about 5–50% by weight of an aqueous preparation according to claim 1.

3. In the production of porous ceramic bodies which comprises adding and admixing a porosifying agent to a raw ceramic mixture, molding the admixture into a desired shape, drying and burning the shaped article to the desired ceramic body, the improvement which comprises said porosifying agent being an aqueous preparation according to claim 1 in an amount of 5 to 50% by weight.

* * * * *